(12) United States Patent
Pierini et al.

(10) Patent No.: US 9,399,495 B2
(45) Date of Patent: Jul. 26, 2016

(54) STEERING HEAD FOR MOTORCYCLES INTEGRATING STEERING DAMPING MEANS

(71) Applicant: UNIVERSITA DEGLI STUDI DI FIRENZE, Florence (IT)

(72) Inventors: Marco Pierini, Prato (IT); Niccolo Baldanzini, Florence (IT); Alessandro Giorgetti, Sesto Fiorentino (IT); Simone Piantini, Bagno a Ripoli (IT); Cosimo Monti, Florence (IT)

(73) Assignee: UNIVERSITA DEGLI STUDI DI FIRENZE, Florence (FI) (IT)

( * ) Notice: Subject to any disclaimer, the term of this patent is extended or adjusted under 35 U.S.C. 154(b) by 0 days.

(21) Appl. No.: 14/415,247

(22) PCT Filed: Jul. 16, 2013

(86) PCT No.: PCT/IB2013/055847
§ 371 (c)(1),
(2) Date: Jan. 16, 2015

(87) PCT Pub. No.: WO2014/013435
PCT Pub. Date: Jan. 23, 2014

(65) Prior Publication Data
US 2015/0129379 A1    May 14, 2015

(30) Foreign Application Priority Data

Jul. 18, 2012   (IT) ................................ FI2012A0151

(51) Int. Cl.
*F16D 57/00*   (2006.01)
*F16F 9/53*    (2006.01)
(Continued)

(52) U.S. Cl.
CPC ................. *B62K 21/08* (2013.01); *F16F 9/145* (2013.01); *F16F 9/535* (2013.01)

(58) Field of Classification Search
CPC ................ F16D 3/06; F16D 3/12; F16F 1/14; F16F 15/18; F16F 9/145; F16F 9/535; F16F 9/3415; B62D 7/224; B62K 21/08
USPC ................... 188/290, 293, 306, 267.1, 267.2; 280/777, 779
See application file for complete search history.

(56) References Cited

U.S. PATENT DOCUMENTS 5,257,681 A * 11/1993 Shtarkman ............... F16F 9/535
                                                              188/130
5,598,908 A *  2/1997 York ....................... F16D 37/02
                                                              188/267

(Continued)

FOREIGN PATENT DOCUMENTS

JP    2005172096    6/2005
JP    2009287639    12/2009
(Continued)

OTHER PUBLICATIONS

International Search Report issued in PCT Application No. PCT/IB2013/055847.

*Primary Examiner* — Christopher Schwartz
(74) *Attorney, Agent, or Firm* — Lucas & Mercanti, LLP

(57) ABSTRACT

The present invention refers to the field of steering dampers for motorcycles in general and in particular it refers to a steering head integrating a magnetorheological type steering damper.

19 Claims, 4 Drawing Sheets

(51) Int. Cl.
*B62K 21/08* (2006.01)
*F16F 9/14* (2006.01)

(56) References Cited

U.S. PATENT DOCUMENTS

| | | | | |
|---|---|---|---|---|
| 5,697,122 | A | * | 12/1997 | Okabe .................. E05F 3/14 16/82 |
| 6,095,295 | A | * | 8/2000 | Park .................... F16F 9/145 188/267.2 |
| 6,121,526 | A | * | 9/2000 | Kobori ................. F16F 9/145 188/291 |
| 6,318,522 | B1 | | 11/2001 | Johnston |
| 6,955,249 | B2 | * | 10/2005 | Biasiotto ............. F16F 9/145 188/267.1 |
| 7,380,804 | B2 | * | 6/2008 | Lee ..................... B62D 7/224 280/777 |
| 7,416,062 | B1 | * | 8/2008 | Arnold ................ F16F 9/535 188/266.3 |
| 8,424,656 | B2 | * | 4/2013 | Hiemenz ............. F16F 9/3415 188/267.2 |
| 2003/0062229 | A1 | * | 4/2003 | Mengoli ............. B62K 21/08 188/290 |
| 2006/0237271 | A1 | * | 10/2006 | Athanasiou ......... B62D 7/224 188/290 |
| 2010/0270773 | A1 | | 10/2010 | Miyashiro et al. |

FOREIGN PATENT DOCUMENTS

| | | |
|---|---|---|
| JP | 2010167999 | 8/2010 |
| WO | 2005035349 | 4/2005 |

* cited by examiner

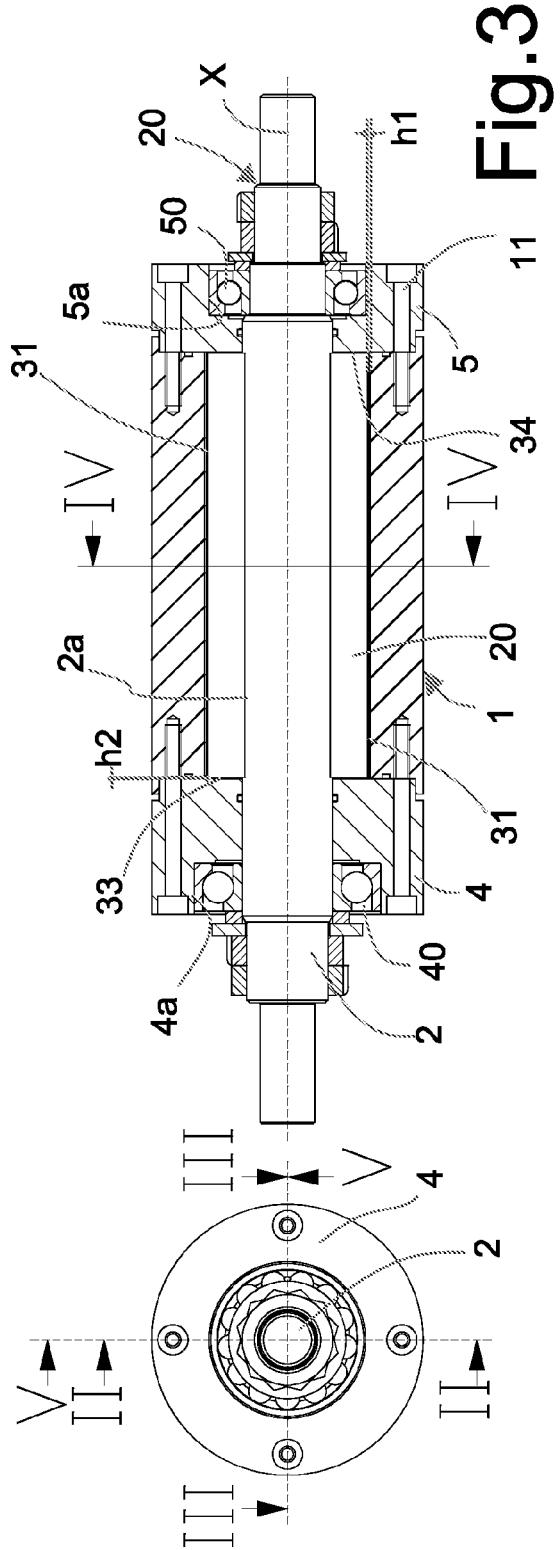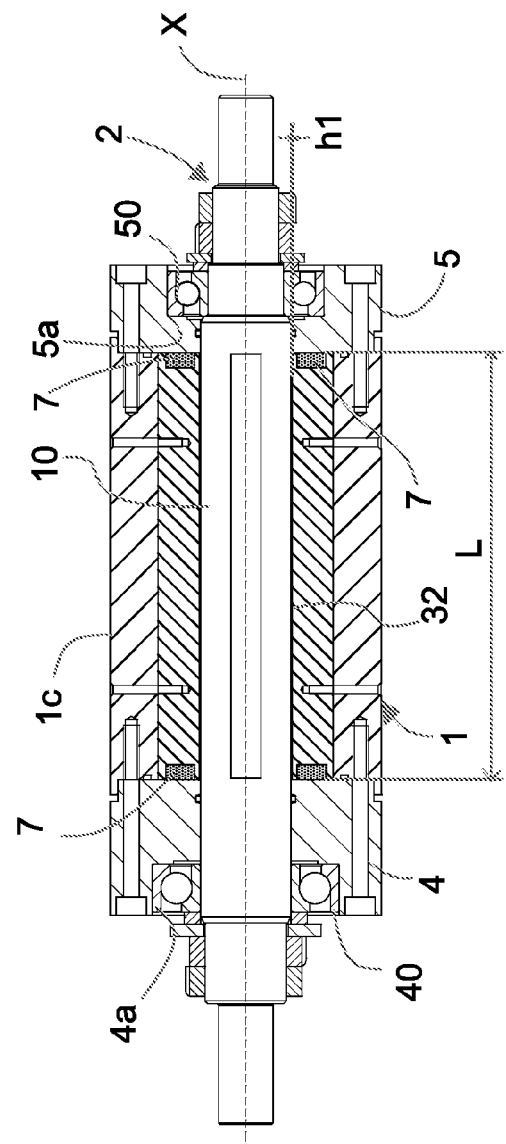

STEERING HEAD FOR MOTORCYCLES INTEGRATING STEERING DAMPING MEANS

CROSS-REFERENCE TO RELATED APPLICATIONS

This application is a 371 of PCT/IB2013/055847, filed Jul. 16, 2013, which claims the benefit of Italian Patent Application No. FI2012A000151, filed Jul. 18, 2012.

FIELD OF THE INVENTION

The present invention refers to the field of steering dampers for the motorcycles in general and in particular it concerns a steering head integrating a magnetorheological steering damper.

BACKGROUND OF THE INVENTION

As it is known, a steering damper damps down on oscillations that can occur on the steering system and be transmitted to a driving member such as a handlebar of a motorcycle. Specifically in the field of motorcycling, it is particularly critical when there are such oscillations, since they can give way to a phenomenon of instability also known as the wobble or shimmy effect. Such an effect, if not suitably dampened, can also be very dangerous for the rider since it can lead to riding difficulties and the loss of control of the motorcycle.

However, the damping action of the damper, when not strictly necessary, or rather in non-critical riding conditions (without wobble effect), can have some drawbacks; in particular the resistance to the steering rotation is generally increased (so called "hardness" of the steering block), leading to less comfortable riding and causing the rider to become tired sooner, thus also negatively affecting riding safety.

Again the steering damper increases the overall weight of the motorcycle, negatively affecting its performance and the ease of riding.

Still limiting the considerations to the field of motorcycling, which the present description specifically refers to, one solution of a steering damper that is technically simple and relatively widespread is the one that provides a linear damper that is arranged externally with respect to the steering head and operates tangentially between the handlebar and the frame.

Research has recently, however, started aiming at more functional and compact systems, of rotary nature, that are formed on the axis of the steering block or associated with it. Among these, focus has been put on systems of the magnetorheological type, or rather that use fluids that, in the presence of a magnetic field, are capable of instantaneously and reversibly changing their inner viscosity in a proportional manner with respect to the magnetic field itself. Such a property of magnetorheological fluids is thus exploited so as to dampen, as a function of the velocity of the motorcycle, the mutual rotation between two components at least one of which is in direct kinematic connection with the steering shaft of the motorcycle.

Steering dampers of a rotary nature and using magnetorheological fluids have therefore been proposed. Among these, some systems potentially aimed for use with motorcycles (that impose stricter weight constraints, reduction of bulk, ease of maintenance, manufacturing cost-effectiveness) are for example those described in documents US2010/0270773, JP2010167999, WO2005035349 and WO2005035349.

Such systems are not however satisfactory, both in terms of overall efficiency and for the fact that they foresee a relatively high number of components which increases the constructive complexity, exposes the device to higher risk of breaking and complicates maintenance and assembly/disassembly operation, in particular when maintenance operations indeed require dismounting and subsequently reassembling the front part of the motorcycle.

Again, Japanese patent JP2009287639 and U.S. Pat. No. 6,318,522 disclose rotational dampers that are connected to the frame of a vehicle through some kind of supports. The dampers and the frame thus remain two structurally separate elements, and therefore, considering the fundamental requirement to avoid mechanical interferences, the dampers have blades that mainly develop in the radial direction, thus being axially compact.

SUMMARY OF THE INVENTION

The object of the present invention is therefore to provide an actual steering head integrating a damper with magnetorheological fluid which avoids the problems outlined above and that, in addition to reducing, in a completely effective manner, the aforementioned wobble effect, permits to maintain a high riding comfort.

One important particular object of the invention is then that of providing a steering head of the aforementioned type that can be assembled to the motorcycle (and disassembled) very easily, and that is per se constructively simple.

Another object of the present invention is to provide a steering head of the aforementioned type that has relatively small bulk and light weight.

These and other objects are achieved with a steering head integrating steering damper means according to the invention, the essential characteristics of which are defined by the first of the attached claims. Further important characteristics are contained in the dependent claims.

BRIEF DESCRIPTION OF THE DRAWINGS

The characteristics and the advantages of the steering head according to the present invention shall become clearer from the following description of an embodiment thereof given as an example and not for limiting purposes with reference to the attached drawings, in which:

FIG. 1 shows an axial view of a steering head according to the invention, with some parts omitted for the sake of illustrative clarity;

FIG. 2 is a longitudinal section view of the steering head of FIG. 1 along the plane indicated with II-II in FIG. 1;

FIG. 3 represents the same steering head in a longitudinal section view according to the plane III-III of FIG. 1.

DETAILED DESCRIPTION OF THE INVENTION

Figure 4:
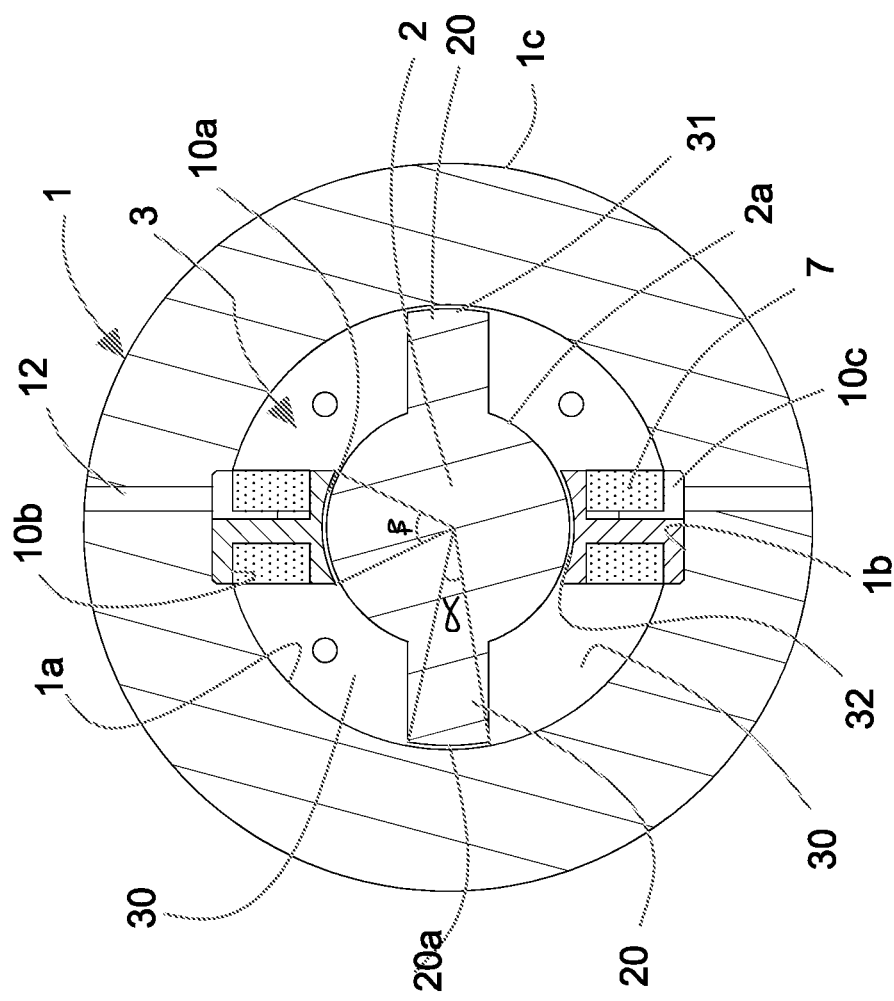
FIG. 4 is a cross section view according to the plane IV-IV of FIG. 3.

With reference to said figures, a steering head according to the invention comprises a cylindrical tubular body 1, which, according to the present embodiment is the same sleeve of the frame of the motorcycle, and a steering shaft 2, arranged coaxially along a common longitudinal axis X and provided with a relative rotary motion, which respectively act as a stator element and as a rotor element of a steering damper with magnetorheological fluid.

With reference to the shown embodiment, neither the frame of the motorcycle to which the sleeve 1 is fixedly attached, nor other secondary components of the steering head such as the steering block plates, dust seals for the bearings etc., are represented in the figures.

The steering shaft or rotor element 2 has an extension along the axis X that is significantly greater with respect to the sleeve 1 (which has an axial length that is indicated with L), so as to project with its ends not only from the sleeve but also from its closing caps 4 and 5 which will be considered more in detail hereafter. Such ends are indeed intended for the connection—with conventional methods—to the fork and to the handlebar of the motorcycle, respectively.

According to the invention, between the shaft 2 and the sleeve 1, i.e. between an outer surface 2a of the first and an inner surface 1a of the second, a gap 3 is defined developing annularly around the axis X, and of course having in turn a length L. The gap 3 is suitable for containing a magnetorheological fluid MR.

The axial closure of the gap 3 is ensured by the respective, already mentioned caps 4, 5, which can for example be integrally connected to the stator element 1 through a sealed head connection (with the interposition of suitable gasket means that have not been represented) by means e.g. of axial screws 11. The caps preferably have the same outer diameter as the stator element 1 so that once the assembly has been achieved, a continuous cylindrical body is made having a constant diameter. Alternatively, the caps can be cup-shaped with a greater diameter, so that they can be screwed on a threading that is formed on an outer surface 1c of the sleeve 1. Clearly, the choice of the type of connection is determined by design and assembly requirements and such examples should not be considered limiting and excluding further possible embodiments (such as for example a screwing of the plugs to an inner shoulder of the stator element).

The caps 4, 5 are also directly responsible for the rotary support of the shaft 2. Indeed, in the seats 4a, 5a, formed on the head faces of the caps, bearings 40, 50 are housed (in this case oblique ball bearings), the inner ring of which is integrally connected to the shaft 2. The assembly of the bearings and the relative components are per se in accordance with the prior art.

Returning to the gap 3, with reference now in particular to FIG. 4, rotor blades 20 project from the shaft 2, and more precisely from its outer surface 2a. In greater detail there are preferably two rotor blades 20 and they project radially from diametrically opposite portions of the shaft, made in a single piece, i.e. integral with the shaft itself, e.g. through moulding. Possibly the blades can be separate elements, that are fixed to the shaft through screws or similar. In such a case, the blades and the shaft can also be made from mutually different magnetic permeable material, where appropriate for optimising the distribution of the magnetic field according to what shall become clearer in the rest of the present description.

In greater detail, the rotor blades 20 typically have a cross-section that is substantially square-shaped or rectangular (but with surfaces that are not necessarily flat) having a certain thickness, each defining a head face 20a (or rather the face opposite that which is in contact with the shaft) in the immediate proximity of the inner surface 1a of the stator element 1, forming in cooperation with it a first slit 31 the thickness h1 of which is defined in the radial direction and the surface development of which is mainly realized in the axial direction. The first slit 31 shall be indicated, in the rest of the description, as "radial", indeed with reference to the thickness parameter. The head face has a convex curvature in accordance with the curvature of the aforementioned surface 1a, so that the radial slit 31 has a constant thickness along the circumference.

Analogously, from the inner surface 1a of the stator element 1 stator blades 10 project, also in a number of two, diametrically opposite, so that the stator blade 10 and rotor blade 20 are mutually spaced apart by 90° when the two elements are in a zero position or null steering position (as shown in FIG. 4).

Recesses 1b are formed running parallel with respect to the axis X along the stator element itself, in order to permit the connection of the stator blades 10 to the stator element 1 on the inner surface 1a. The stator blades are thus locked inside the recesses, possibly by screws or similar connection means that are not represented. Also in this case the specific chosen constructive solution may vary according to known technologies, including welding, gluing, forcing, moulding, chip-removal etc.

The stator blades in turn typically have an overall square or rectangular-shaped section with surfaces that in turn possibly have a certain curvature, and reach with their concave head faces 10a in immediate proximity of the outer surface 2a of the shaft 2, following the curvature and defining a second radial slit 32 with constant thickness.

In light of the above and considering also the drawings, it is clear that the stator and rotor blades substantially extend for the entire axial length of the gap, or rather of the stator element, with a consequent predominant development in the axial direction. Indeed the axial length of the blades is at least equal to 10 times their extension in the radial direction and preferably from 11 to 13 times their radial extension. As an analogy, also the stator has a predominant development in the axial direction; indicatively, the ratio between the inner diameter of the stator and its axial length varies from 1/5 to 2/5.

Again, the radial distance between the various head faces and the respective surfaces of the opposite element, which represents as mentioned the thickness h1 of the slits, is preferably (but not necessarily) constant for all four blade-surface pairs and preferably comprised between 0.3 mm and 1 mm, even more preferably between 0.3 and 0.5 mm. Such a thickness can be extremely small thanks to the axial length of the blades, still making it possible to ensure an optimal compromise between, on one hand, the limitation of load losses and, on the other, the dispersion of the magnetic field.

Between the rotor blades and the caps 4, 5 further slits occupied by the fluid are thus defined, said slits having an axial thickness h2, and defined as first and second axial slits 33, 34. The thickness h2 can indicatively be comprised also in this case between 0.3 mm and 1 mm.

Considering that the axial length of the blades preferably varies, but not in a limiting manner, within a range of 115-155 mm, the ratio between the thickness of the slits and axial length of the blade is comprised between 0.0026 and 0.0065 and, preferably between 0.0026 and 0.0033.

Figure 5:
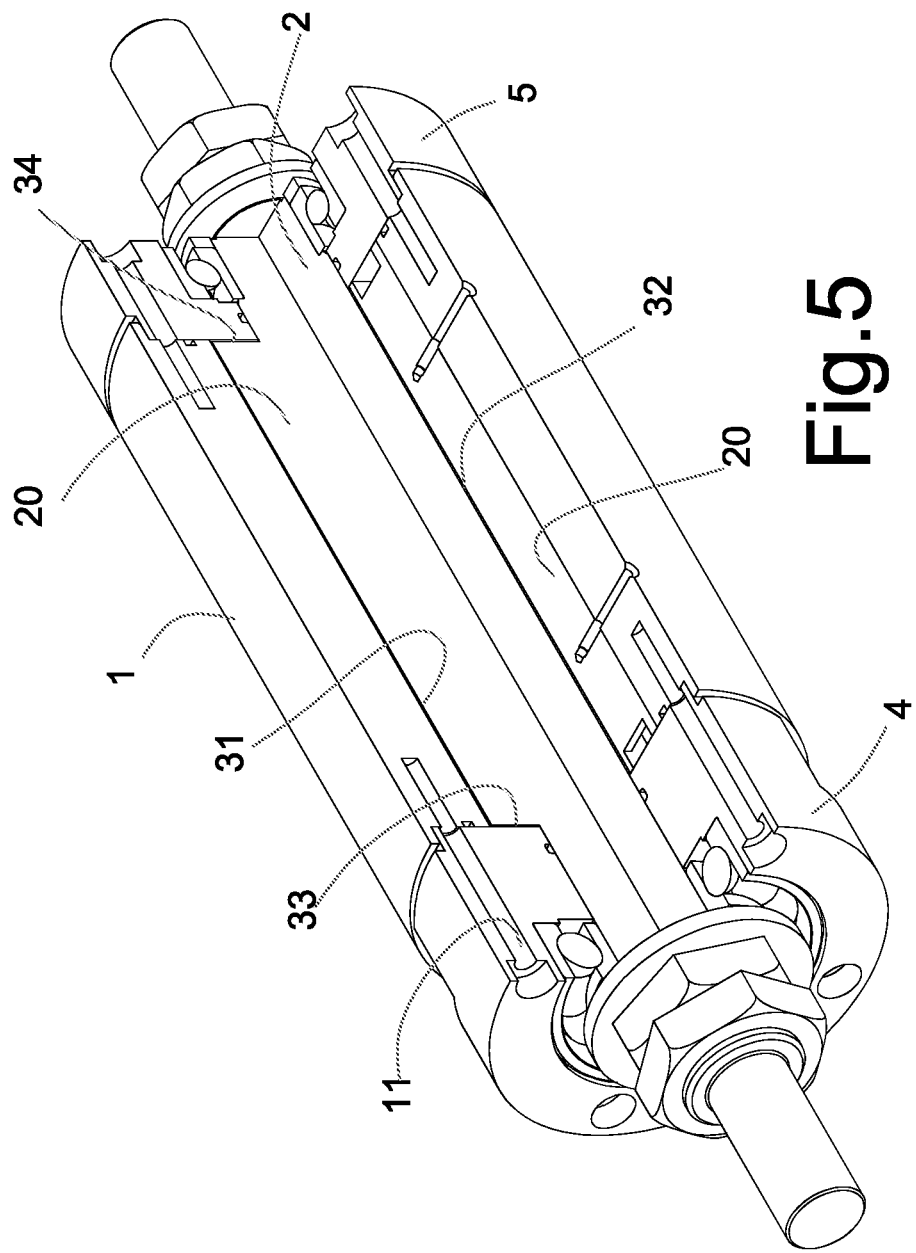
FIG. 5 shows a perspective view of the same steering head, in a split view according to the plane V-V of FIG. 1.

As a result of the rotor and stator blades the gap 3 is thus divided into four chambers 30 each defined between two circumferentially consecutive blades (of which one rotor blade 20 and the other a stator blade 10) and in hydraulic communication through the radial slits 31, 32 and the axial slits 33, 34. With the support also of FIG. 5 it is easy to understand that the radial slits 31, 32 thus extend in a circumferential direction according angles $\alpha$, $\beta$ to the centre and axially along the entire length L of the gap 3, corresponding to that of the sleeve 1.

In a preferred embodiment the ratio between the outer diameter of the rotor element and the inner diameter of the stator element is indicatively 3/5, with a blade thickness (distance between the two sides) which is comprised between 1/3 and 1/4 with respect to the outer diameter of the rotor element or shaft 2. In accordance with the example illustrated, such parameters roughly correspond to angles α, β, of respectively 50° and 20°, such values in any case being variable in a range of ±5°. Slits can thus be obtained that despite having a thickness h1, h2 that is extremely small, ensure a relatively large passage/exchange section for the fluid between the chambers 30.

According to the invention, as mentioned, the fluid housed by the gap 3 is a magnetorheological fluid, means for generating a magnetic field that is adapted to affect the same fluid being also provided.

Specifically, such a magnetic field is obtained through windings 7 of coils made from electrically conductive material (typically copper) arranged on the rotor blades and/or on the stator blades, but preferably and advantageously on the latter, like in the illustrated embodiment, so as to facilitate the connection with an electrical power supply system that is normally the same electrical system of the motorcycle. Holes 12 for the passage of electrical connection wires are formed radially in the stator element 1 at respective stator blades 10, as shown in FIG. 4. Again according to FIG. 4, slots 10c are realised on the stator blades 10, on which the holes 12 open and that assist the electrical contact between the cables and the windings 7.

The windings 7 are arranged according to coils that are elongated in the longitudinal direction, being housed in toroidal tracks 10b formed on the sides of the blade (i.e. on the two mutually opposite radial faces adjacent to the head face 10a) and in transverse faces thereof (i.e. those that abut against the caps). In such a way the arrangement of the coils does not exceed the bulk of the blades, which maintain an overall parallelepiped shape.

A magnetic field is thus generated inside the gap 3, the variation of which, controlled by a control unit that can be programmed from outside, typically as a function of the velocity of the vehicle but more specifically of the detection of incipient wobble phenomenon, causes a proportional variation of the inner viscosity of the magnetorheological fluid MR, and therefore a greater or smaller intensity of the damping torque that opposes the mutual rotation between the rotor element and the stator element. The control unit is typically the same electronic control unit of the vehicle, that is suitably programmed according to measures that are obvious to the skilled person.

Figure 6A:
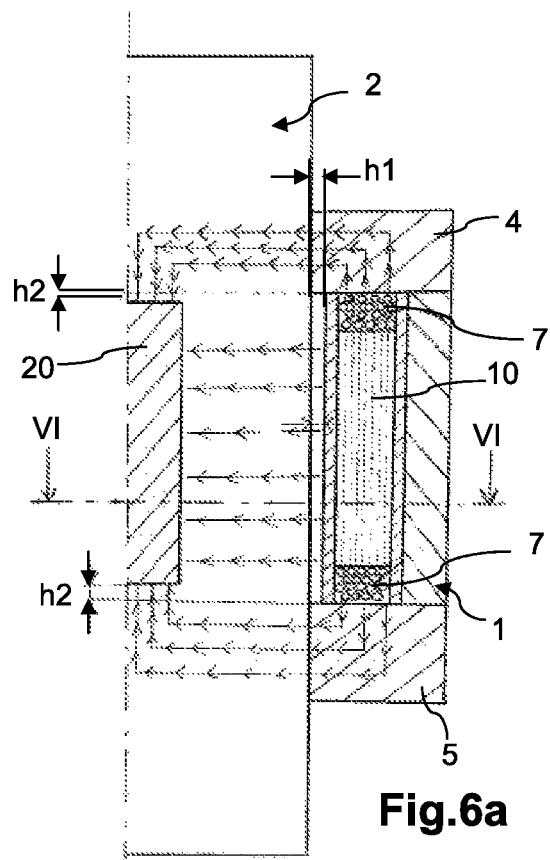
FIGS. 6a and 6b are schematic representations of the distribution of magnetic field generated within the steering head, said figures being a longitudinal section view, and a cross section view according to the plane VI-VI indicated in FIG. 6a, respectively.
Figure 6B:
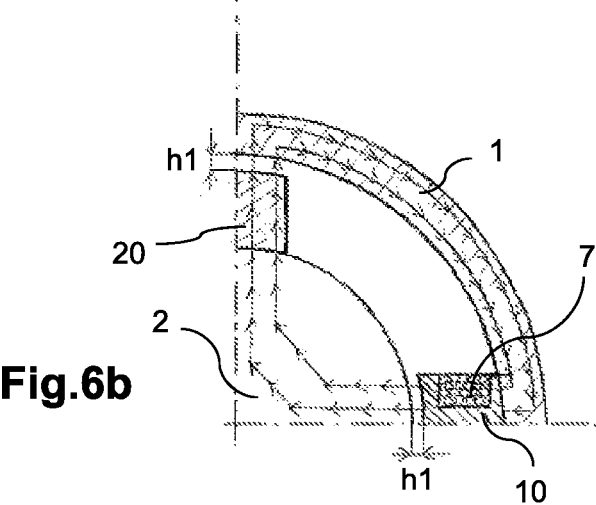

With particular reference to FIGS. 6a and 6b, it is interesting to consider a representation the field lines resulting from the effect of the magnetic field generated by the windings 7 according to the invention. The field closes (see the cross section view of FIG. 6b) through the various slits of fluid 31, 32, 33, 34 with a high intensity (due to the reduced thicknesses h1, h2 of the slits which results from the predominant development in the axial direction) and constant along the entire development of the slits themselves and with a minimum dispersion of field in the chambers 30 (inside which the field is practically null). As already mentioned, the optimisation of the path of the field lines can also take place through the use of materials with different magnetic permeability.

As a result of the rotation of the shaft 2, hydraulic flows are moreover generated through the slits. In the presence of a magnetic field such flows determine load losses (and therefore a resistant/damping torque) with a high intensity, thanks to the extremely small thickness h1, h2 of the slits that makes it possible to maximise the intensity of the magnetic field. When there is no magnetic field, on the other hand, such losses are negligible, because despite their small thickness the slits ensure a passing section that is relatively high due to their elongation in the axial direction. The damping torque value, when there is no magnetic field, is thus minimised.

A surprisingly effective damping is thus obtained with an increased comfort and riding safety. Indeed, when there is no magnetic field, or rather when a damping action is not necessary, the resistance to the rotation of the steering block (so-called hardness of the steering block) is not increased, leading to an extremely comfortable riding and avoiding the rapid tiring of the rider.

The particular arrangement of the windings, with the consequent intensity of the magnetic field at the slits, of course makes it possible to do without sliding seals which mechanically prevent or limit the flow rate of fluid exchanged through the slits themselves, actually making them counter-productive, thus reducing the number of parts, increasing the life of the device and making it possible to use less strict tolerances during the design stage.

In order to optimise the distribution of the magnetic field, the axial slits 33, 34 tend to have the same thickness of the radial slits 31, 32. Indeed, if the thickness h2 of the axial slits were significantly greater than that h1 of the radial slits, the magnetic field would tend to almost entirely close through the latter, with a decrease in the damping capability of the (axial) slits with less involvement of the field. Of course the reverse is also true.

On the other hand, the thickness of the slits affects not only the distribution and intensity of the magnetic field, but also the torque value in absence of a magnetic field (viscous torque). Concerning this, thicknesses that are excessively small, despite leading to an increase in the maximum torque damping value in the presence of the field, imply an undesired increase in the viscous torque value.

Bearing in mind such considerations, the solution descending from the most advantageous compromise, making it possible to optimise the damping and viscous torque value, is that according to which thicknesses h1 and h2 are substantially the same, and within the numerical ranges indicated above. In any case, variations of the thickness in the order of ±20%, related for example to machining tolerances, are considered acceptable.

Again, the arrangement of the windings 7 on the walls of the stator blades, in addition to simplifying assembly/disassembly operations, makes it possible for there to be an easy connection thereof to the external power supply means.

As mentioned, the stator element can be represented directly by the sleeve 1 of the frame of the motorcycle, suitably provided with blades, which increases the prerogative of integration of the damper in the motorcycle, thus reducing the weight and the number of components used.

However, the stator element can also be an additional body or cartridge to be fixedly engaged within the sleeve, according to a variant embodiment that, mutatis mutandis, can of course be understood from what has been described above. With a solution of this kind, the variant according to which the caps are screwed inside the stator element becomes of particular interest.

Such a second embodiment makes it possible in particular to produce a preassembled device, integrating the steering head and the damper, which can be assembled and disassembled as a unit with respect to the frame of the motorcycle. This makes it possible to facilitate assembling and disassembling operations, as well as maintenance operations, in particular maintenance of the steering head can occur without disassembling the damper. Moreover, with such an embodiment it is possible to have greater freedom of choice of the material as far as the stator element is concerned (which in this case does not have directly structural functions), with at the same time the possibility of leaving the sleeve of the steering block with its own diamagnetic structure (with the use of materials conventionally used, in particular aluminium).

Both versions in any case achieve a significant construction simplification, in terms of a small number of components from which there is consequently greater reliability, since there is no need in particular to use additional systems for connecting the frame of the motorcycle to a damper which represents a separate component thereof. It is moreover indeed in virtue of the novel dimension ratios envisaged according to the invention that it is possible to obtain at the same time a structure that is functionally effective and suitable for being integrated in the sleeve of the steering block.

Again the windings can be present only on the stator blades as previously described or only on the rotor blades, or on both of them.

The invention is not indeed limited to such preferred embodiments, and further embodiments are possible belonging to the same inventive concept, all covered by the scope of protection of the following claims.

The invention claimed is:

1. A steering system of a motorcycle, said system comprising a steering shaft and a steering damper, the steering damper comprising: a stator tubular element defining an inner surface, a central longitudinal axis (X) and a length (L) measured along said axis; two caps that close respective axial ends of said stator element; a rotor defining an outer surface, arranged within said stator element along said longitudinal axis (X) and provided with relative rotary motion, passing, in a hydraulically sealed manner, through said caps; an annular gap that runs around said axis (X) between said stator element and said rotor and containing a magnetorheological fluid (MR); at least one stator blade projecting in a radial direction from said inner surface of said stator element; at least one rotor blade projecting in a radial direction from said outer surface of said rotor; at least two chambers of said gap being defined between said blades; said at least one stator blade and said at least one rotor blade having respective head faces that define radial slits in cooperation with, respectively, said outer surface of said rotor and said inner surface of said stator element, said radial slits being adapted to permit the exchange of said fluid between said chambers in response to a variation in angular position of said shaft with respect to said stator element; and means for generating an electromagnetic field arranged on said at least one stator blade and/or said at least one rotor blade configured so as to generate a magnetic field that affects substantially only the fluid contained in said slits, wherein said rotor is said steering shaft of the motorcycle having ends projecting from said caps and intended for the connection to a fork and to a handlebar of the motorcycle, respectively, and wherein said at least one rotor blade and at least one stator blade have a mainly axial development extending substantially for the entire axial length of said annular gap, the axial length of said blades being at least 10 times their radial extension.

2. The steering system according to claim 1, wherein said at least one stator blade and said at least one rotor blade run parallel with respect to said axis (X) substantially involving the entire axial length (L) of said gap.

3. The steering system according to claim 2, wherein said means for generating electromagnetic fields comprise a winding arranged on at least one stator blade with turns elongated along said axis (X) for said axial length (L).

4. The steering system according to claim 3, wherein said winding is arranged within a toroidal track formed in sides of the corresponding blade, that is two mutually opposite radial faces adjacent to said head face and in transversal faces thereof, that is end faces orthogonal with said axis.

5. The steering system according to claim 4, wherein at said at least one stator blade at least one hole intended for the passage of electrical connection wiring is radially formed in said stator element, on said blade being a slot being formed in said blade on which said hole opens to assist the electrical contact between said wiring and said winding.

6. The steering system according to claim 2, comprising at least two stator blades and at least two rotor blades arranged in a circumferentially alternated fashion.

7. The steering system according to claim 2, wherein said inner and outer surfaces of said stator element and of said shaft are cylindrical with a substantially circular transversal section, the head faces of said stator blades and of said rotor blades being respectively concave and convex with a curvature matching the curvature of said inner and outer surfaces.

8. The steering system according to claim 1, wherein said at least one rotor blade and/or said at least one stator blade define, between the blades themselves and said caps, axial slits filled by said fluid and affected by said magnetic field.

9. The steering system according to claim 8, wherein said radial slits have a thickness between 0.5 mm and 1.5 mm.

10. The steering system according to claim 9, wherein said axial slits substantially have the same thickness of said radial slits.

11. The steering system according to claim 8, wherein said radial slits have a thickness preferably between 0.5 and 1 mm.

12. The steering system according to claim 1, wherein said axial length of said blades is between 10 and 13 times greater than their radial extension.

13. The steering system according to claim 12, wherein the axial length of said stator and rotor blades is between 115 and 155 mm.

14. The steering system according to claim 13, wherein the ratio between the thickness of said slits and the axial length of said blades is between 0.0026 and 0.0065.

15. The steering system according to claim 13, wherein the ratio between the thickness of said slits and the axial length of said blades is between 0.0026 and 0.0033.

16. The steering system according to claim 12 wherein, said stator element has a predominant development in the axial direction, wherein the ratio between the inner diameter of said stator element and its axial length is between 0.2 and 0.4.

17. The steering system according to claim 1, wherein the ratio between the outer diameter of said rotor element and the inner diameter of said stator element is about 0.6, the distance between two sides of each blade, that is between two mutually opposite radial faces adjacent to said head face, being between 0.33 and 0.25 with respect to the outer diameter of said rotor element.

18. The steering system according to claim 1, wherein said stator element is a sleeve of a frame of a motorcycle.

19. The steering system according to claim 1, wherein said stator element is a tubular body adapted to be engaged within a sleeve of a frame of a motorcycle.

* * * * *